March 11, 1924.　　　　　O. E. HOVEY　　　　　1,486,143
CENTER BEARING
Filed March 24, 1923　　　2 Sheets-Sheet 1

Witnesses:
Edwin Trueb

Inventor:
OTIS E. HOVEY,
by D. Anthony Usina
his Attorney.

March 11, 1924.
O. E. HOVEY
CENTER BEARING
Filed March 24, 1923     2 Sheets-Sheet 2
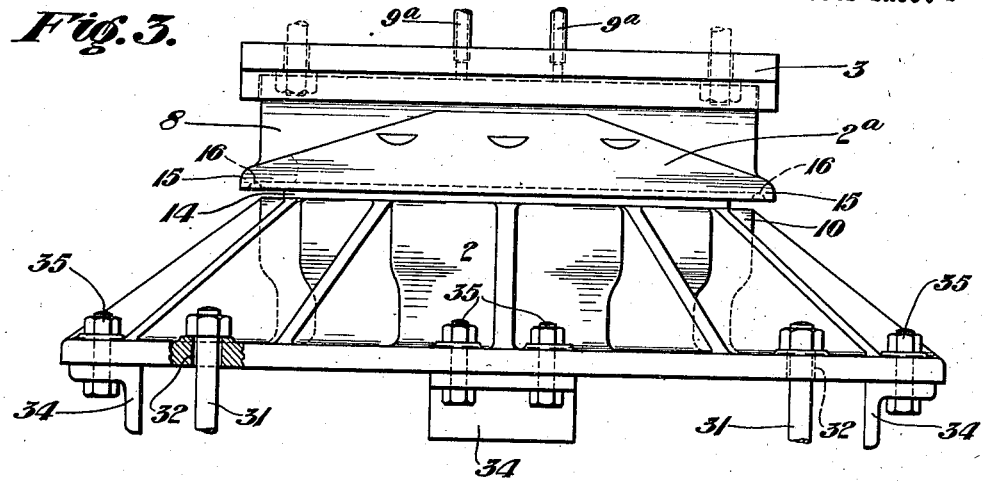
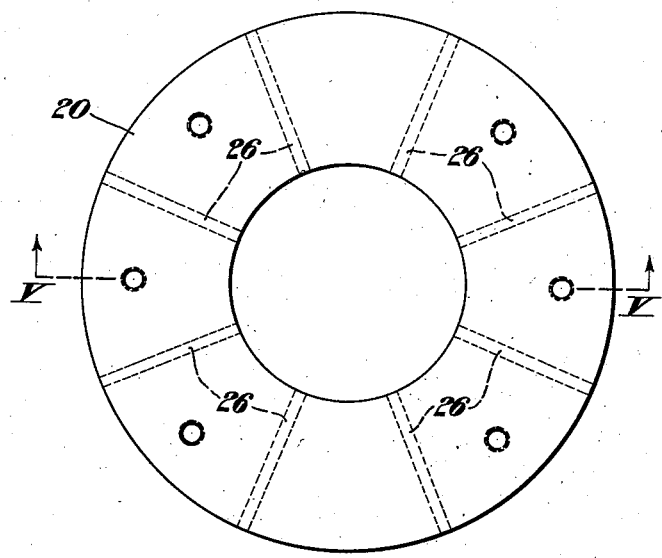
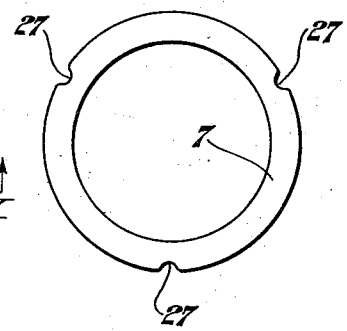
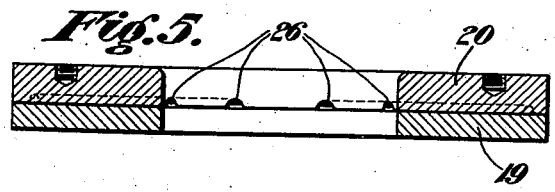
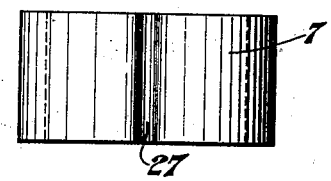
Witnesses:
Edwin Trueb
Inventor:
OTIS E. HOVEY,
by
his Attorney.

Patented Mar. 11, 1924.

1,486,143

UNITED STATES PATENT OFFICE.

OTIS E. HOVEY, OF NEW YORK, N. Y.

CENTER BEARING.

Application filed March 24, 1923. Serial No. 627,441.

*To all whom it may concern:*

Be it known that I, OTIS E. HOVEY, a citizen of the United States, and resident of New York, in the county of New York and State of New York, have invented certain new and useful Improvements in Center Bearings, of which the following is a specification.

My invention relates to center bearings and more particularly to center bearings for use under turntables, swinging drawbridges and similar structures, which are arranged to turn about a vertical axis of rotation.

One object of my invention is to provide a center bearing of improved construction, having novel means whereby the superimposed load, carried on the bearing, is concentrated and then distributed to the various parts of the bearing, and wherein great strength and rigidity are obtained without unduly increasing the vertical overall height of the bearing.

Another object of my invention is to provide a center bearing with annular anti-friction disks within the center adapted to carry the load and which are easily removable in case of wear under long and severe service.

Another object of the invention is to provide for axial rotation of the moving parts of the bearing by means of overlapping central posts.

Another object is to provide a bearing having novel means whereby the contact surfaces are effectively lubricated.

A further object is to provide a bearing having novel anchoring means whereby the bearing may be effectively anchored to the foundation so that it will not be displaced by horizontal and lateral forces.

A still further object is to provide a bearing having the novel construction and combination of parts described in the following specification and illustrated in the accompanying drawings, in which—

Figure 3 is a side elevation of the complete bearing.

Figure 4 is a plan of the anti-friction disks.

Figure 5 is a sectional elevation of the anti-friction disks on the line V—V of Figure 4.

Figure 6 is an enlarged fragmentary detail of a portion of the upper anti-friction disk showing one of the oil grooves.

Figure 7 is a plan and Figure 8 is an elevation of the central guide and thrust bearing showing the oil grooves for lubrication.

Figure 1:
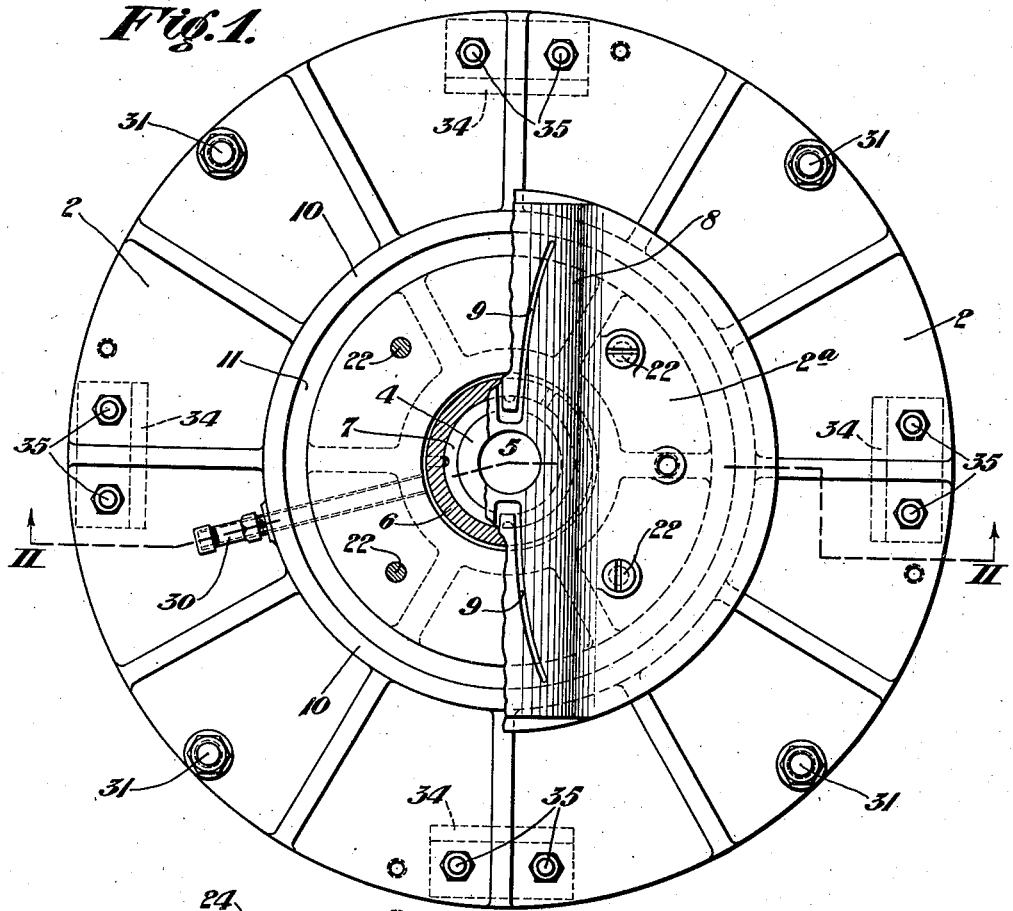
Figure 1 is a plan, partly in section, of a center bearing constructed and arranged in accordance with my invention, the upper disk box having been removed in the upper left hand quarter of the figure and the anti-friction disks also having been removed in the lower left hand quarter of the figure.
Figure 2:
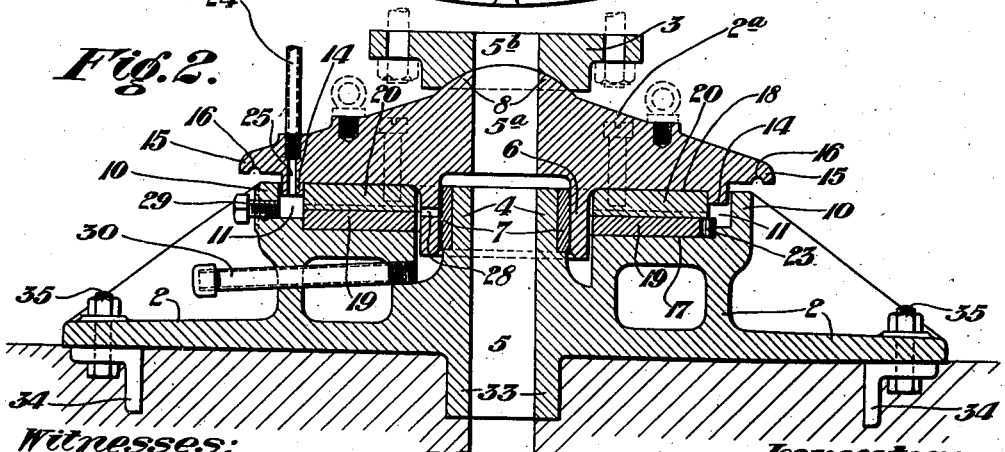
Figure 2 is a sectional elevation on the line II—II of Figure 1.

Referring more particularly to the drawings, the numeral 2 designates the lower and $2^a$ the upper disk box of a center bearing made in accordance with my invention. Mounted on the top of disk box $2^a$ is a saddle or load support 3. The lower disk box 2 has an integral upwardly extending, axially central, cylindrical projection or post 4, with a central opening or bore 5 therethrough. The upper disk box $2^a$ has an integral downwardly extending, axially central, cylindrical hollow projection or post 6 adapted to be telescopically mounted over the post 4, and bear against or engage an annular ring 7 of anti-friction metal, which is forced upon the post 4. By this construction the upper disk box $2^a$ is made to rotate axially around post 4 of the lower disk box 2 when the center is revolved. The two telescoping posts 4 and 6, with the bushing or bearing member 7, also form a rigid vertical thrust bearing adapted to transmit any longitudinal or transverse horizontal forces, which act upon upper disk box $2^a$ to the lower disk box 2, and thence to the foundation.

The upper disk box $2^a$ has a long ridge or projection 8 which extends horizontally across the top of the box. The ridge 8 is convex in cross section and supports the saddle 3 which is provided with a concave bearing surface to receive the ridge 8, so that the saddle 3 may rock or slide on the ridge 8, should the center of gravity of loads on the saddle not be directly above the the vertical axis of the bearing. To make this rocking movement more certain oil grooves 9 are formed in the top of the ridge 8 and oil is supplied thereto through pipes $9^a$ screwed into suitable apertures in the saddle 3. The object of this saddle construction is to deliver all loads upon the center bearing uniformly to the bearing disks. The lower disk box 2 has an annular, vertically extending flange 10 which, with the central posts, forms a recess 11 within the lower box which serves as an oil reservoir. This reservoir is kept filled with oil to about the height of flange 10. The upper disk box 2ᵃ is provided with a downwardy extending annular flange 14 and an outwardly projecting rim portion 15. The portion 15 is provided with an annular groove 16 in its under surface. The projection 15 and groove 16 serve to prevent dust and water entering the interior of the bearing. Machine finished recesses 17 and 18 are made in the upper face of the disk box 2 and the lower face of the disk box 2ᵃ for the reception of the anti-friction annular disks 19 and 20, respectively. The disk 20 is anchored against rotation relative to the disk box 2ᵃ by bolts 22, and the disk 19 is anchored against rotation relative to the disk box 2 by dowels 23. An oil pipe 24 connects with an oil hole 25 in the disk box 2ᵃ, thereby furnishing a convenient means for filling oil recess 11 with oil. The flange 10 and the central post 4 extend at least to the top of disk 20, so that a sufficient quantity of oil may be maintained in the recess 11 to immerse both disks 19 and 20.

Oil grooves 26 of adequate size are cut either in the lower surface of the disk 20, as shown in the drawings, or in the upper surface of disk 19 if preferred. These oil grooves 26 are preferably made radial and extend completely across the disk. Oil grooves 27 are formed in the outer peripheral face of the central, vertical thrust bearing 7, and oil holes 28 are drilled through the post 6. It will thus be seen that the anti-friction disks 19 and 20 and thrust members 6 and 7 not only run in an oil bath, but that the oil grooves and holes serve to thoroughly distribute the oil over all the contact surfaces when the bearing is in motion.

Plugged holes 29 opposite the oil grooves provide means for cleaning any clogged grooves by the insertion of a suitable tool. A capped drainage pipe 30 provides convenient means for draining the oil from the center bearing and cleaning it out by flushing with any suitable fluid when it becomes clogged.

The ordinary methods of securing a center bearing against movement on the foundation is by means of anchor bolts 31 through holes 32 in the base of disk box 2 and extending into the foundation. Experience has shown that it is very difficult to prevent all relative motion by means of such bolts, as they present only a small surface to the foundation material and hence in nearly all cases eventually become loose in the holes and in many cases shear off. As the horizontal forces applied to center bearings, caused by impacts of passing loads upon turntables and bridges, and more particularly to the traction effort of mechanical power applied to accelerate and turn heavy loads, are rather large, it is desirable to make provision for these forces by other means than the ordinary anchor bolts. My invention, therefore, provides heavy lugs 33 and 34 which are adapted to be firmly embedded in the foundation. The lugs 33 and 34 may be cast integral with the base of the lower disk box 2 or may be formed separate and bolted or otherwise secured thereto. In the drawings, the central lug 33 is shown cast integral with the base of disk box 2 and the rim lugs 34 are formed from angle members secured in position by tight fitted bolts 35. Any desired contact area can be obtained by lengthening the lugs or making the downstanding legs wider. Suitable recesses may be made in the foundation to receive the lugs when the bearing is placed. These recesses are to be filled then with concrete, mortar or any other suitable substance, after the bearing has been placed.

The central holes 5, 5ᵃ and 5ᵇ formed in the post 4, disk box 2ᵃ and saddle 3, form a convenient means for bringing wires, air pipes, or other conductors of power from within the foundation through the center bearing and to the revolving superstructure supported by it.

While I have shown and described only one preferred embodiment of my invention it will be understood that I do not wish to be limited thereto, since various modifications may be made without departing from the scope of my invention as defined in the appended claims.

I claim:—

1. A center bearing comprising a housing composed of upper and lower box members, a centrally arranged cylindrical post formed integral with and projecting upwardly from the inside bottom face of said lower box member, a centrally arranged cylindrical hollow post formed integral with and depending from the inside top face of said upper box member and telescoping over said post on said lower box member, an annular bushing of anti-friction metal mounted around the post on said lower box member and adapted to form a bearing surface between said posts, an annular vertically extending flange formed on said lower box member adapted with said central posts to form an oil chamber, a pair of annular disks of anti-friction metal mounted in said housing, one of said disks being secured to the upper and the other of said disks being secured to the lower box member, radial oil grooves formed in the contacting face of one of said disks, other oil grooves formed in the outer periphery of said annular bushing mounted on the post on said lower box, and means for supplying oil to said oil chamber and said grooves.

2. A center bearing comprising a housing composed of upper and lower box members, a centrally arranged cylindrical post formed integral with and projecting upwardly from the inside bottom face of said lower box member, a centrally arranged cylindrical hollow post formed integral with and depending from the inside top face of said upper box member and telescoping over said post on said lower box member, an annular bushing of anti-friction metal mounted around the post on said lower box member and adapted to form a bearing surface between said posts, an annular vertically extending flange formed on said lower box member adapted with said central posts to form an oil chamber, anti-friction members mounted within said housing, and means for supplying oil to said oil chamber and said anti-friction means.

3. A center bearing comprising a housing composed of upper and lower disk box members, a saddle member mounted for rocking movement on the top of said face of said upper box member, a centrally arranged cylindrical hollow post formed integral with and projecting upwardly from the inside bottom face of the lower box member, a second centrally arranged cylindrical hollow post formed integral with and extending downwardly from the inside top face of said upper box and telescoping over said post on said lower box member, an annular bushing of anti-friction metal mounted around the post formed on said lower box member and adapted to form a bearing surface between said posts, an annular vertically extending flange formed on said lower box member adapted with the central posts to form an oil chamber, a pair of annular disks of anti-friction metal mounted in said housing, one of said disks being secured to the upper and the other of said disks being secured to the lower box member, radial oil grooves formed in the contacting face of one of said disks, other oil grooves formed in the outer periphery of said annular bushing mounted on the post on said lower box, means for supplying oil to said oil chamber and a plurality of rigid lugs depending from said lower box member adapted to take the horizontal forces developed during use of said bearing.

4. A center bearing comprising a housing composed of upper and lower disk box members, a saddle member mounted for rocking movement on the top face of said upper box member, a centrally arranged cylindrical hollow post formed integral with and projecting upwardly from the inside bottom face of the lower box member, a second centrally arranged cylindrical hollow post formed integral with and extending downwardly from the inside top face of said upper box and telescoping over said post on said lower box member, an annular bushing of anti-friction metal mounted around the post formed on said lower box member and adapted to form a bearing surface between said posts, an annular vertically extending flange formed on said lower box member adapted with the central posts to form an oil chamber, a pair of annular disks of anti-friction metal mounted in said housing, one of said disks being secured to the upper and the other of said disks being secured to the lower box member, radial oil grooves formed in the contacting face of one of said disks, other oil grooves formed in the outer periphery of said annular bushing mounted on the post on said lower box, means for supplying oil to said oil chamber, a plurality of anchor bolts mounted in said lower box member adapted to be secured in the foundation for said bearing, and a plurality of rigid depending lugs on said bottom box member adapted to be secured in the foundation to prevent the horizontal forces developed during the use of said bearing from loosening or damaging said bolts.

5. A center bearing comprising a housing composed of upper and lower disk box members, a saddle member mounted for rocking movement on the top face of said upper box member, a centrally arranged cylindrical hollow post formed integral with and projecting upwardly from the inside bottom face of the lower box member, a second centrally arranged cylindrical hollow post formed integral with and extending downwardly from the inside top face of said upper box and telescoping over said port on said lower box member, an annular bushing of anti-friction metal mounted around the post formed on said lower box member and adapted to form a bearing surface between said posts, an annular vertically extending flange formed on said lower box member adapted with the central posts to form an oil chamber, anti-friction members mounted within said housing and means for supplying oil to said oil chamber and said anti-friction means.

6. A center bearing comprising a housing composed of upper and lower box members, a centrally arranged cylindrical post formed integral with and projecting upwardly from the inside bottom face of said lower box member, a centrally arranged cylindrical hollow post formed integral with and depending from the inside top face of said upper box member and telescoping over said post on said lower box member, an annular bushing of anti-friction metal mounted around the post on said lower box member and adapted to form a bearing surface between said posts, an annular vertically extending flange formed on said lower box member adapted with said central posts to form an oil chamber, anti-friction members mounted within said housing, means for supplying oil to said oil chamber and said anti-friction means and a plurality of rigid lugs depending from said lower box member adapted to take the horizontal forces developed during use of said bearing.

7. A center bearing comprising a housing composed of upper and lower box members, anti-friction members mounted in said box members, a plurality of anchor bolts mounted in said bottom box member and adapted to be secured in the foundation on which said bearing is positioned, a central lug depending from the base of said lower box member, and a plurality of other depending lugs spaced around the periphery of the base of said lower box, said lugs being adapted to be embedded in the foundation for said bearing to prevent the horizontal forces developed during use of said bearing from loosening or damaging said bolts.

8. A center bearing comprising a housing composed of upper and lower box members, anti-friction members mounted in said box members, a plurality of anchor bolts mounted in said bottom box member and adapted to be secured in the foundation on which said bearing is positioned, a central lug formed integral with and depending from the base of said lower box member, and a plurality of other depending lugs detachably mounted on and spaced around the periphery of the base of said lower box, said lugs being adapted to be embedded in the foundation for said bearing.

In testimony whereof, I have hereunto signed my name.

OTIS E. HOVEY.